United States Patent [19]
Schroeder

[11] 3,802,679
[45] Apr. 9, 1974

[54] REVERBERATORY FURNACE WITH AIR COOLED INLET

[76] Inventor: Melvin P. Schroeder, 1607 Newton Ave. North, Minneapolis, Minn.

[22] Filed: Aug. 21, 1972

[21] Appl. No.: 282,128

[52] U.S. Cl............................................. 266/33 R
[51] Int. Cl............................................. F27b 17/00
[58] Field of Search................. 266/24, 33 R, 33 S

[56] References Cited
UNITED STATES PATENTS

| | | | |
|---|---|---|---|
| 2,092,145 | 9/1937 | Wanner | 266/33 R |
| 1,875,169 | 8/1932 | Sklenar et al. | 266/33 R |
| 2,510,352 | 6/1950 | Sklenar | 266/33 R |

Primary Examiner—Gerald A. Dost
Attorney, Agent, or Firm—Williamson, Bains & Moore

[57] ABSTRACT

A reverberatory furnace having a restricted charge inlet and exhaust gas inlet throat at one end thereof subject to high heat build-up is cooled by incoming combustion air which is circulated completely around the throat through a heat exchange passage and then directed through an annular air flow conduit along the length of the furnace before flowing to a burner at the opposite end of the furnace.

8 Claims, 5 Drawing Figures

REVERBERATORY FURNACE WITH AIR COOLED INLET

BACKGROUND OF THE INVENTION

Reverberatory furnaces of the type having a bottom wall on which iron is melted and an upper wall from which heat reflects or reverberates on to the melting iron, conventionally incorporate an upright stack at one end which serves as both a charging stack for the introduction of pig iron and iron scraps into the furnace and as an outlet for exhaust gases. The area where the bottom of the stack turns or angles to join the main combustion chamber of the furnace necessarily takes the form of a restricted throat where chunks and pieces of iron being charged into the furnace tend to accumulate. By exposure to the combustion chamber and the passage of hot gas over them, these pieces of iron in the furnace throat become extremely hot, thereby causing the refractory material lining the throat to be subjected to excessively high temperatures as well as to the abrading effect of incoming iron pieces. As a result, the refractory lining of the throat normally deteriorates relatively rapidly.

Prior efforts to cope with this problem have been primarily directed to constructing the furnace walls in such a way that the refractory bricks in the throat area are readily accessible and easy to replace. The invention disclosed herein is directed to a more positive approach to this problem comprising cooling the throat area of the furnace so as to prevent the extremely high temperatures at this location which, in combination with the abrading effect of iron pieces being charged into the furnace, are the primary cause of the high deterioration rate of the refractory material lining the throat area.

BRIEF SUMMARY OF THE INVENTION

The reverberatory furnace with which this invention is concerned has a combined charge inlet and exhaust gas outlet throat of restricted cross-sectional area extending between one end of the furnace combustion chamber and an upright stack, the furnace structure being particularly characterized by a cooling passage in heat exchange relation with the walls of the furnace throat through which incoming combustion air is circulated prior to flowing to one or more burners. The combustion air thereby serves as a cooling agent to prevent excessively high temperatures from developing in the refractory walls of the throat and resulting rapid deterioration of the throat wall surfaces.

These basic objectives and advantages are achieved by forming the aforesaid cooling passage so that it extends completely around the inlet and exhaust throat for complete cooling thereof, the cooling passage being in fluid flow communication with annular air flow conduit means extending through the furnace walls to one or more burners at the opposite end of the furnace from the aforesaid throat. By reason of this particular air flow passage arrangement, the incoming combustion air cools not only the throat but also the main walls of the furnace defining its combustion chamber, the combustion air being thereby significantly pre-heated for improved combustion.

In accordance with a preferred structural embodiment of the furnace of this invention, the enclosure walls defining the furnace are comprised of an inner refractory lining and a heat conductive metal wall extending around the outside surface thereof in heat exchange relation with that lining, the enclosure walls of the furnace being of substantially cylindrical shape defining an elongated, generally horizontally extending cylinderical furnace. Both the aforesaid cooling passage and air flow conduit means are formed around the outside of the furnace between an outermost cylindrical wall segment and the aforesaid heat conductive metal wall, whereby heat is discipated from the throat and main walls of the furnace by conduction, convection, and radiation, a portions of the furnace heat being radiated to the surrounding atmosphere from the outer walls of the cooling passage and air flow conduit means.

The refractory furnace of this invention is preferably of the type supported on rollers permitting rotation of the furnace for discharge of molten metal through a pouring spout. As a particularly advantageous form of the furnace structure, one of the rotary support beams extending circumferentially around the outside of the furnace and rotatably supporting the furnace on rollers includes a portion thereof extending transversely inwardly across the aforesaid air flow conduit means and serving as a dividing wall separating the air flow conduit means from the cooling passage around the throat. A plurality of ports in the dividing wall portion of the rotary support beam permit restricted, fluid flow communication between the cooling passage and the annular air flow conduit means extending along the length of the furnace to one or more burners. With incoming combustion air being directed into the cooling passage and around the furnace throat, the dividing wall portion of the rotary support beam assists in initially confining the combustion air to the cooling passage around the furnace throat before restricted flow of the combustion air takes place through the ports and the rotary support beam into the annular air flow conduit means leading to the burner.

These and other objects and advantages of my invention will be readily apparent as the following description is read in conjunction with the accompanying drawings wherein like reference numberals have been used to designate like elements throughout the several views.

BRIEF DESCRIPTION OF THE DRAWINGS

FIG. 5 is a fragmentary end view of the furnace of FIG. 1 showing the combustion air flow conduit leading to a burner.

DETAILED DESCRIPTION

Figure 1:
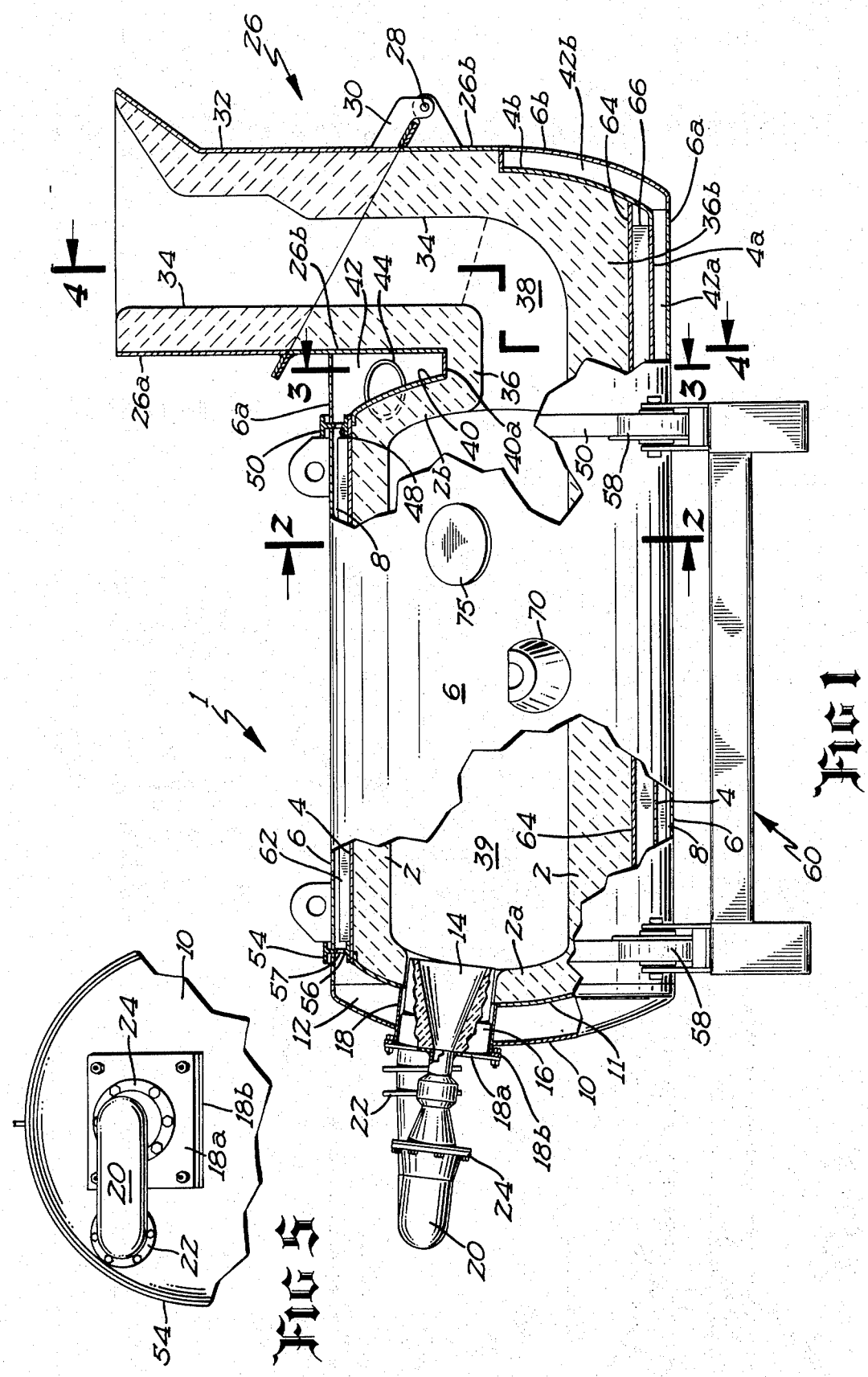
FIG. 1 is a side elevation view, partially in section, of the furnace of this invention.
Figure 2:
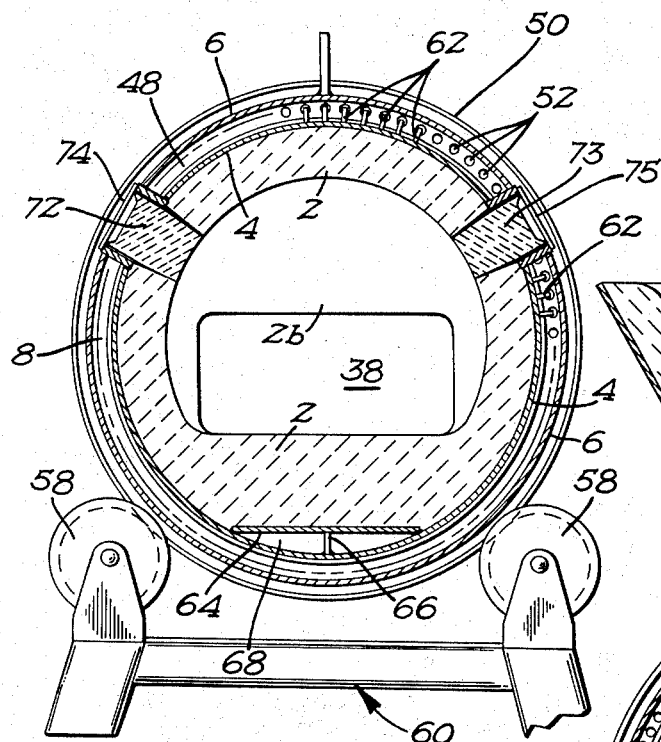
FIG. 2 is a vertical section view, taken along alines 2—2 of FIG. 1.

Referring now to the drawings, I have shown in FIGS. 1 and 2, a reverberatory furnace incorporating the particular structural and heat exchange features of this invention. The furnace is generally indicated by reference numeral 1 and is preferably formed from enclosure walls defining a furnace of elongated, cylindrical shape oriented in the horizontal position shown. The enclosure walls of the furnace are comprised of an inner, refractory lining of fire brick or other suitable material 2 and a first heat conductive metal shall 4 extending around the outside of refractory lining 2 in heat exchange relation therewith. Outwardly spaced from metal shell 4 is a second heat conductive metal shell or wall 6 which cooperates with inner shell 4 to define therebetween an annular space 6 which serves as a combustion air flow conduit means for cooling the walls of the furnace in a manner here is after described. Arcuate, dome shaped end walls 10 and 11 are welded or otherwise secured to the ends of cylindrical shells 6 and 4 and are spaced apart as shown to form an end passage 12 communicating with air flow conduit passage 8. Shells 4 and 6, as well as end walls 10 and 11 are preferably made of steel.

Extending through end walls 10 and 11 as well as through end wall portion 2a of refractory lining 2 is a gun type of burner 14 which is housed within a refractory sleeve 16. Burner 14 may be of any of the well known types adapted to burn oil, gas, or a combination of both, the fuel lines to the burner having not been shown since the burner and fuel feed arrangement forms no part of the invention. A metal mounting collar 18 serves as a mounting bracket for the burner assembly and is welded to inner and outer end shells 10 and 11 through which it extends around refractory sleeve 16. A mounting plate 18a affixed to burner 14 is bolted or otherwise secured to a peripheral flange 18b on mounting collar 18. As may best be understood by reference to FIGS. 1 and 5, combustion air is directed into burner 14 through an air duct 20 which is coupled to end wall passage 12 of furnace 1 by coupling flanges 22 to receive combustion air from air flow conduit passages 8 and 12. A flange connection 24 serves to attach air duct 20 to burner 14.

Figure 4:
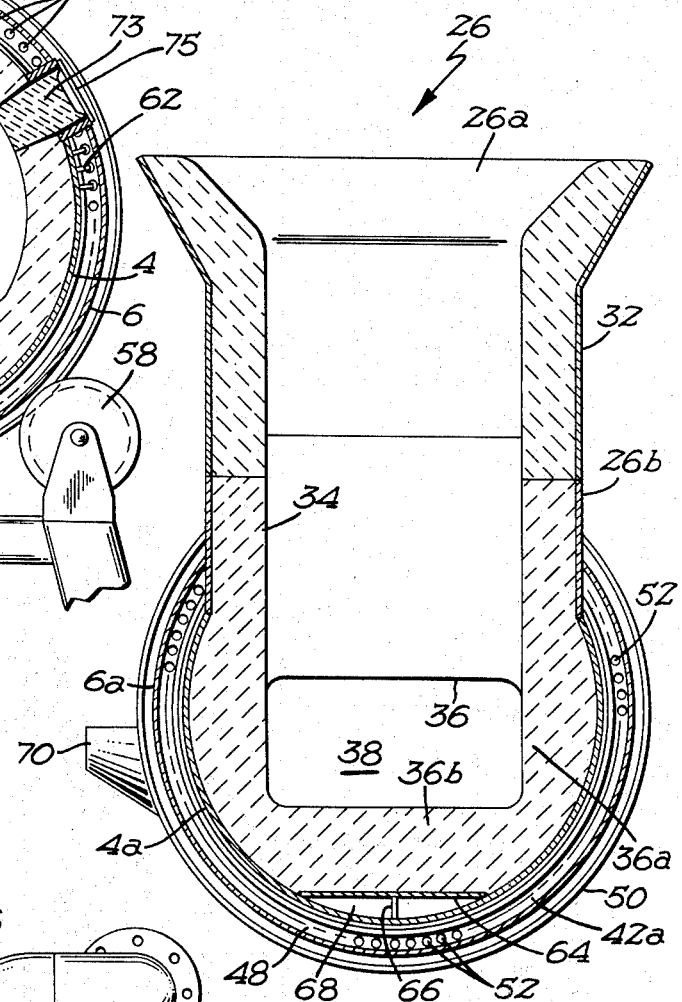
FIG. 4 is a vertical section view, taken along lines 4—4 of FIG. 1.

At the opposite end of furnace 1 from burner 14 is a substantially vertically extending charge supply and exhaust gas stack 26 which is preferably of two-piece construction comprising an upper hinged section 26a and a lower, stationary section 26b. Upper exhaust stack section 26a is pivotally connected to section 26b by means of a hinge pin 28 extending through bracket arm 30 affixed to section 26a. It will thus be appreciated that upper stack section 26a may be pivoted outwardly and rearwardly as viewed in FIG. 1 about hinge pin 28 to permit better access to the lower part of the combined charging and exhaust stack 26 for servicing. Stack 26 has an outer steel shell 32 and an inner refractory lining 34. The shape and construction of stack 26 may best be understood by reference to both FIGS. 1 and 4.

Figure 3:
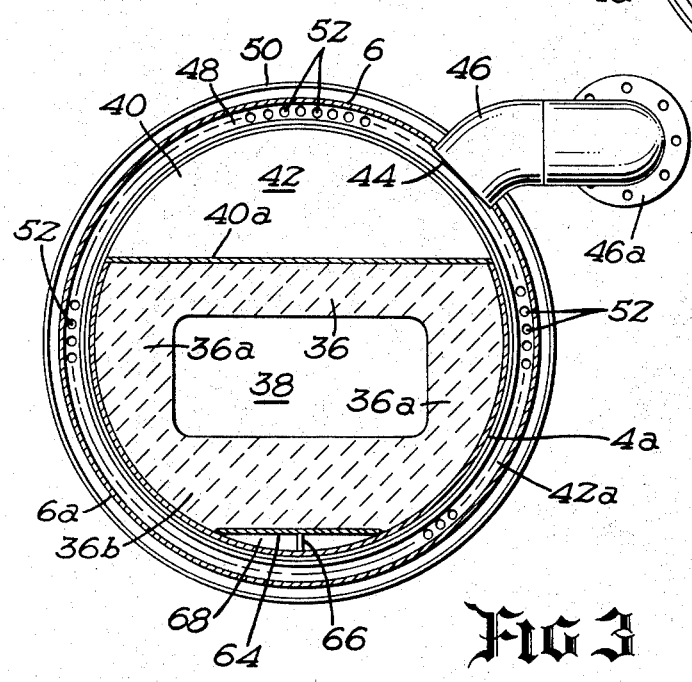
FIG. 3 is a vertical section view, taken along lines 3—3 of FIG. 1.

A generally horizontal, outward extension of refractory lining 2 comprised of upper, vertical, and bottom refractory wall elements 36, 36a, and 36b serves to define a charge inlet and exhaust gas throat 38 at the opposite end of the furnace from burner 14. As may best be understood by reference to FIGS. 1 and 3, bottom throat wall element 36b is a substantially horizontal extension of the bottom wall of furnace refractory lining wall 2 and curves upwardly at its outer end to merge with the inwardly angled bottom portion of stack lining 34. It is this inwardly curved and angled bottom portion of the stack and the horizontal passage extending inwardly therefrom towards the furnace which defines throat 38, the outer extremity of which is indicated by the dotted line is FIG. 1. An arcuate end wall 2b of fire brick or other refractory material extends upwardly from upper wall element 36 of throat 38 to form the end of furnace 1 opposite burner 14; and refractory lining walls 2, 2a, and 2b cooperate to define a combustion chamber indicated by reference number 39 in FIG. 1. As most clearly appears in FIGS. 2 and 3, throat 38 is of reduced cross sectional area in relation to the cross sectional area of combustion chamber 39 and extends between the bottom of stack 26 and combustion chamber 39. An arcuate steel shell segment 40 covers the refractory end wall 2b and includes a horizontal segment 40a overlying throat 38 and its upper refractory wall segment 36. As is indicated in FIG. 3, throat upper wall 36 and overlying steel wall segment 40a are horizontal and are spaced a substantial distance downwardly from extension 6a of outer furnace shell 6 to form an air receiving or plenum chamber 42 of relatively large volume for a purpose hereinafter explained.

Vertical and horizontal refractory wall elements 36a and 36b of throat 38 are covered by outward extension 4a of inner steel shell 4 of furnace 1. Also, as noted above, outer steel shell 6 of furnace 1 extends horizontally outwardly from the furnace end opposite burner 14 along a portion thereof designated by reference numeral 6a spaced from inner steel wall segment 4a to define therebetween passage 42a of annular shape which communicates with chamber 42 in the manner clearly shown in FIG. 3. The outermost ends of steel segments 4a and 6a curve outwardly and upwardly along segments 4b and 6b thereof in spaced apart relation to define therebetween a forwardly disposed air space 2b extending around the forward, curved end of throat 38. Outer steel shell segment 6b at the front end of the furnace 1 is joined at its upper end to lower section 26b of stack 26.

It is important to note that steel wall segments 40a, 4a, and 4b are in direct contact with the outside surface of the refractory wall elements 36, 36a, and 36b defining throat 38. These steel wall segments are good conductors of heat, and cooperate with throat wall elements 36, 36a, and 36b to conduct heat outwardly. Chamber 42, annular space 42a, and forwardly disposed annular space 42b are interconnected and cooperate to form a continuous heat exchange passage completely embracing charging an exhaust gas throat 38. Combustion air is directed into chamber 42 of this continuous heat exchange passage through an inlet port 44 in outer shell segment 6a. Port 44 is connected to a source of pressurized combustion air (not shown) by means of an air inlet duct 46. As is well known in the art, the combustion air is pressurized by means of a blower or fan which is connected to duct 46 by a flange 46a, such a blower or fan not being shown herein as it forms no part of this invention.

The heat exchange passage comprised of chamber 42 and annular spaces 42a and 42b is separated from annular flow conduit space 8 by means of a baffle of a dividing wall 48 which advantageously forms part of a rotary support beam 50 extending circumferentially around the outside of furnace 1. Dividing wall portion 48 of support beam 50 extends transversely inwardly from outer steel shell 6 through annular space 8 and is provided with a plurality of spaced apart air ports 52. The dividing wall or baffle 48 serves to initially contain incoming combustion air within chamber 42 and its interconnected passages 42a and 42b for effective cooling of throat 38 prior to permitting restricted flow of combustion air through ports 52 into annular flow conduit 8. A second rotary support beam 54 extends around the outside of furnace 1 at the opposite end thereof from beam 50 and also includes an inwardly extending segment 56 projecting trasversely across air flow conduit space 8. Beam segment 56 is also provided with a plurality of air ports 57 through which combustion air can flow from annular air space 8 into end passage 12 of furnace 1. Support beams 54 are preferably both I-beams and are welded at their inner ends to inner steel shell 4. Rotary support beams 50 and 54 are rotatably supported on a plurality of spaced apart rollers 58 positioned beneath the furnace at opposite ends thereof and supported on a base assembly 60 in the manner shown in FIGS. 1 and 2. The purpose of this rotary support for furnace 1 is to permit it to be revolved or tipped about its longitudinal axis to discharge molten metal through a pouring spout 70 formed in a conventional manner in the furnace sidewall. It is to be understood that the rotary support of furnace 1 is not essential, and that a stationary furnace can be utilized with the heat exchange structural features of this invention.

To further enhance the cooling of the walls of furnace 1, I preferably utilize a plurality of longitudinally extending conductive fins 62 welded or otherwise secured to inner conductive metal shell 4. Fins 62 are utilized only around the top and upper sidewalls of furnace 1, the lowermost fins 62 being located at about the elevation shown in FIG. 2. There are no cooling fins 62 disposed around the bottom of combustion chamber 39 on inner shell 4 because it is not desired to unduly cool the combustion chamber where molten metal accumulates. To hold the heat in the bottom of the combustion chamber and to maintain the mass of molten metal at the desired high temperature to preserve its molten state, the bottom portion of refractory lining 2 has a greater thickness, as noted in FIGS. 1 and 2, than the side and upper wall portions thereof. Also, to avoid the undue discipation of heat from the bottom of furnace, a horizontal plate 64 is installed along the bottom of the furnace inside of inner shell 4 in vertically spaced relation there to in the manner shown in FIG. 2 and supported by an upright plate or rib 66. In this manner a dead air space 68 is formed between plate 64 and the bottom of inner steel shall 4 to serve as an insulating space preventing the undue tranfer of heat from the bottom of the furnace outwardly.

In FIGS. 1 and 2 I have shown a pair of opposed service plugs 72 and 73 which are removably installed in access openings in the side walls of furnace 1 and covered by removable cover plates 74 and 75. Covers 74 and 75 are normally held in place in engagement with service plugs 72 and 73 by means of releasable clamps, not shown. Plugs 72 and 73 are sufficiently large that when they are removed, they provide an access opening through which workmen may achieve access to the interior of the furnace within combustion chamber 39 for the purpose of inspecting the furnace walls and repairing and relining the refractory material 2 as required.

In operation, a charge of iron normally comprised of scraps of cast iron and pig iron is introduced into the furnace through stack 26 and throat 38. The use of one or more burners 14 having a nozzle directed substantially lengthwise of the furnace into combustion chamber 39 develops a temperature sufficient to melt this metal and form molten iron in the bottom of the furnace, heat being reverberated from the top of refractory lining 2 onto the molten mass in the bottom of the furnace. Molten iron is periodically tapped from the furnace by rotating it on roller 58 and discharging molten iron through spout 70. Utilizing a combined exhaust gass and inlet throat 38 of restricted cross sectional area tends to prevent the undue loss of heat upwardly through exhaust stack 26. However, in conventional furnaces the inner surfaces of refractory wall elements 36, 36a, and 36b defining throat 38 tend to deteriorate and wear away at an excessive rate due to the extremely high temperatures generated in throat 38 combined with the abrading effect of iron chunks or pieces being charge through the throat area. Since burner 14 is directed towards throat 38, and pieces of iron tend to accumulate in the throat and be heated to a very high temperature by exhaust gases flowing over them, the temperatures encountered in throat 38 can be extremely high, causing a relatively rapid deterioration of the refractory lining of the throat.

By virtue of the particular heat exchange passage arrangement providing by the furnace structure of this invention, I have overcome this problem to a large extent. Relatively cool, incoming combustion air directed into chamber 42 through port 44 flows completely around the walls defining throat 38, thereby cooling the throat zone by a combination of conduction, convection, and radiation. Since outer steel segment 6a comprising the outer wall of the heat exchange passage around throat 38 is exposed to the atmosphere, heat transferred to this shell segment by convection, utilizing combustion air, is ultimately dissipated to the surrounding atmosphere by radiation. After flowing completely around throat 38 through a heat exchange passage comprised of air chamber 42 and interconnected annular spaces 42a and 42b, the combustion air flows into annular air conduit space 8 in a restricted manner through ports 52 in dividing wall of baffle 48. Annular air conduit 8 extends completely along the length of furnace 1 around the outer peripheral surface, with the result that the flow of combustion air therethrough serves to cool the walls of furnace 1 along its entire length. Dead air space 68 along the bottom of the furnace serves to prevent the undue dissipation of heat from The mass of molten metal lying on the bottom of the furnace. As combustion air flows towards burner 1 through annular air conduit 8, it passes through ports 57 in dividing wall segment 56 of rotary support beam 54 into end passage 12 of the furnace walls. From passage 12, the combustion air enters air duct 20 leading to burner 14. It will be appreciated by those skilled in the art, that the incoming combustion air is desirably preheated in the process of cooling throat 38 and the walls of furnace 1. Fins 62 attached to inner steel shell 4 assist in transferring heat to the combustion air from the top and side walls of the furnace.

I anticipate that various changes can be made in the size, shape, and construction features of the furnace described herein without departing from the spirit and scope of my invention as defined by the following claims.

I claim:

1. A metal melting furnace comprising:
    enclosing wall means of generally cylindrical shape defining an elongated, cylindrical combustion chamber and furnace;

a burner projecting into said combustion chamber at one end thereof;

wall elements defining a combined charge inlet and exhaust gas outlet passage at the opposite end of said furnace communicating at one end with said combustion chamber and at the opposite end thereof with a combined charge supply and exhaust gas stack;

a heat exchange passage completely embracing said inlet and exhaust passage in heat exchange relation with said wall elements thereof;

a combustion air inlet port opening into said heat exchange passage and connected to a source of pressurized combustion air;

air flow conduit means of annular shape extending from said heat exchange passage through said enclosure wall means along substantially the entire length thereof around the outside of said combustion chamber to said burner, whereby incoming combustion air cools said enclosure wall means as well as said inlet and exhaust passage enroute to said burner; and a dead air space extending along the bottom of said furnace interposed between said combustion chamber and said air flow conduit means to prevent undue cooling of the bottom of said combustion chamber wherein a mass of molten metal is formed.

2. A metal melting furnace comprising:

enclosing wall means of substantially cylindrical shape defining an elongated, generally horizontally extending cylindrical combustion chamber and furnace;

a burner projecting into said combustion chamber;

wall elements defining a combined charge inlet and exhaust gas outlet passage as an outward extension of said enclosing wall means of reduced cross sectional area with respect to said combustion chamber at one end of said furnace, said inlet and exhaust passage communicating at one end with said combustion chamber and at the opposite end thereof with a combined charge supply and exhaust gas stack;

a heat exchange passage completely embracing said inlet and exhaust passage in heat exchange relation with said wall elements thereof, said heat exchange passage having an outer wall portion exposed to the surrounding atmosphere, whereby heat will be transferred from said inlet and exhaust passage, utilizing relatively cool combustion air, by means of convection, conduction and radiation;

a combustion air inlet port opening into said heat exchange passage and connected to a source of pressurized combustion air; and air flow conduit means extending from said heat exchange passage through said enclosing wall means to said burner, whereby incoming combustion air cools said enclosing wall means as well as said inlet and exhaust passage enroute to said burner.

3. A furnace as defined in claim 2 wherein:

said enclosure wall means is comprised of an inner refractory lining and a heat conductive metal wall extending around the outside surface thereof in heat exchange contact with said lining; and said air flow conduit means and said heat exchange passage are formed around the outside of said furnace between an outermost cylindrical wall segment and said heat conductive metal wall.

4. A furnace as defined in claim 3 wherein:

said burner and said inlet and exhaust passage are at opposite ends of said furnace;

said air flow conduct means is of annular shape and extends along substantially the entire length of said enclosure wall means around the outside of said combustion chamber; and a plurality of heat conductive fins attached to said heat conductive metal wall at circumferentially spaced locations thereon and projecting into said annular air flow conduit means.

5. A furnace as defined in claim 2 wherein:

said air flow conduit means is of annular shape and extends along substantially the entire length of said enclosure wall means around the outer periphery thereof;

a rotary support trunnion beam extending circumferentially around the outside of said furnace and rotatably supporting said furnace on rollers, said beam having a portion thereof extending transversely inwardly across said annular air flow conduit means and separating said a exchange passage from said air flow conduit means; and a plurality of ports in said portion of said beam permitting restricted, fluid flow communication between said heat exchange passage and said annular air flow conduit means.

6. A rotary furnace comprising:

enclosure wall means defining a combustion chamber;

a burner projecting into one end of said combustion chamber;

wall elements defining a combined charge inlet and exhaust gas throat at the opposite end of said combustion chamber; said inlet and exhaust gas throat communicating at one end thereof with said combustion chamber and at its opposite end with a combined charge supply and exhaust gas stack;

a heat exchange passage completely embracing said inlet and exhaust throat in heat exchange relation with said wall elements thereof, said heat exchange passage having an outer wall portion exposed to the surrounding atmosphere at said opposite end of said combustion chamber;

a combustion air inlet port opening into said heat exchange passage and connected to a source of pressurized combustion air; and annular air flow conduit means extending along substantially the entire length of said enclosure wall means in heat exchange relation therewith between said heat exchange passage and said burner, whereby incoming combustion air cools said enclosure wall means as well as said inlet and exhaust throat in route to said burner; and a rotary support trunnion beam extending circumferentially around the outside of said enclosure wall means and rotatably supporting said furnace on rollers, said trunnion beam having a portion thereof extending transversely inwardly across said annular air flow conduit means to define a dividing wall separating said heat exchange passage from said air flow conduit means; and a plurality of ports in said portion of said trunnion beam permitting restricted flow communication between said heat exchange passage and said air flow conduit means, whereby said portion of said trunnion beam served to initially contain incoming combustion air within said heat exchange passage for effective cooling of said throat prior to permitting restricted flow of combustion air through said ports into said annular air flow, conduit means in a direction towards said burner.

7. A reverberatory furnace for melting metal comprising:
enclosure wall means defining a combustion chamber of elongated, cylindrical shape extending in a generally horizontal direction;
a burner projecting into said combustion chamber at one end thereof;
wall elements extending from the opposite end of said combustion chamber and defining a combined charge inlet and exhaust gas thoat of reduced cross-sectional area with respect to that of said combustion chamber;
a vertically extending charge supply and exhaust gas stack adjacent said opposite end of said combustion chamber, said throat communicating at one end thereof with said combustion chamber and at its opposite end with the bottom of said stack;
a heat exchange passage completely embracing said throat in heat exchange relation with said wall elements thereof, said heat exchange passage having an outer wall portion exposed to the surrounding atmosphere;
a combustion air inlet port opening into said heat exchange passage and connecting to a source of pressurized combustion air; and
air flow conduit means extending from said heat exchange passage through said enclosure wall means along the outside peripheral surface of said furnace to said burner, whereby incoming combustion air cools said enclosure wall means as well as said throat.

8. A furnace as defined in claim 7 wherein:
said heat exchange passage includes as a portion thereof an enlarged plenum chamber formed between said opposite end of said combustion chamber and said stack over said throat, and said port opening into said plenum chamber.

* * * * *

UNITED STATES PATENT OFFICE
CERTIFICATE OF CORRECTION

Patent No. 3,802,679             Dated   April 9, 1974

Inventor(s)   Melvin Paul Schroeder

It is certified that error appears in the above-identified patent and that said Letters Patent are hereby corrected as shown below:

In claim 5, line 24 add -- heat --; line 25 should be a part of preceding paragraph and "a" should be deleted; line 26 "a plurality of ports" should be a new paragraph.

Signed and sealed this 30th day of July 1974.

(SEAL)
Attest:

McCOY M. GIBSON, JR.  
Attesting Officer

C. MARSHALL DANN  
Commissioner of Patents